(12) United States Patent
Chen et al.

(10) Patent No.: US 8,518,466 B2
(45) Date of Patent: Aug. 27, 2013

(54) SELENIUM COVERED BASIC COPPER CHLORIDE, ITS PREPARATION METHOD AND THE USE

(75) Inventors: Changming Chen, Guangdong (CN); Yanshen Wen, Guangdong (CN); Danyang Li, Guangdong (CN); Pengju Mao, Guangdong (CN); Yihua Peng, Guangdong (CN)

(73) Assignee: Shenzhen Hazardous Waste Treatment Station Ltd., Shenzhen, Guangdong (CH)

( * ) Notice: Subject to any disclaimer, the term of this patent is extended or adjusted under 35 U.S.C. 154(b) by 345 days.

(21) Appl. No.: 12/451,544

(22) PCT Filed: Sep. 27, 2008

(86) PCT No.: PCT/CN2008/072563
§ 371 (c)(1),
(2), (4) Date: Dec. 8, 2010

(87) PCT Pub. No.: WO2010/034160
PCT Pub. Date: Apr. 1, 2010

(65) Prior Publication Data
US 2011/0223298 A1    Sep. 15, 2011

(51) Int. Cl.
*C01G 3/05*    (2006.01)
(52) U.S. Cl.
USPC .......................................... 426/74; 426/807
(58) Field of Classification Search
USPC .................................................... 426/74, 807
See application file for complete search history.

(56) References Cited

PUBLICATIONS

Dennis et al. J. Am. Chem. Soc. vol. XLI, pp. 949-970, Jan.-Jun. 1919.*
Ernest et al. J. Am. Chem. Soc. 1929, vol. 51(5) pp. 1457-1458.*
Pollard et al. Mineralogical Soc., Dec 1989, vol. 53, pp. 557-563.*
Muspratt, Quat. J. Chem Soc. vol. 11, pp. 52-70, 1850.*

* cited by examiner

*Primary Examiner* — Chhaya Sayala
(74) *Attorney, Agent, or Firm* — Raymond Y. Chan; David and Raymond Patent Firm

(57) ABSTRACT

A preparation method for selenium covered basic copper chloride includes the steps of: (a) adding crystalline basic copper chloride (TBCC), water and stabilizer in a reactor; adding sodium hydroxide solution with stirring; reacting to form a hydroxyl-modified crystalline basic copper chloride after discharge, washing, and negative pressure leaching; (b) adding the hydroxyl-modified crystalline basic copper chloride and water in the reactor, adding selenous acid with stirring; adding copper sulfate pentahydrate after reaction; forming selenium covered basic copper chloride comprising crystalline basic copper chloride, basic cuprous selenide, and basic cupric sulfate after discharge, rinsing, negative pressure filtration, and drying. The selenium covered basic copper chloride is used as feed addictives of trace elements having nonhygroscopic property, good liquidity, and stable chemical property. The selenium covered basic copper chloride is easy to incorporate with feed, low price, low cost in adding, weak acidic solubility, easy to absorb.

8 Claims, 1 Drawing Sheet

SELENIUM COVERED BASIC COPPER CHLORIDE, ITS PREPARATION METHOD AND THE USE

BACKGROUND OF THE PRESENT INVENTION

1. Field of Invention

The present invention relates to a compound preparation, and more particularly to selenium covered basic copper chloride preparation and usage.

2. Description of Related Arts

Selenium was originally classified as toxic substance until 1957 that people realized it is an essential trace element, and was found that selenium can prevent certain diseases. In 1973, using labeling technique selenium was detected an essential component of glutathione peroxidase, which determined it is a necessary trace element for animals. In the same year, the World Health Organization announced that selenium is a trace element essential to human physiology. In 1974 FDA of USA allowed to add selenium in animal feed.

Selenium biological effects in animals are: (1) Selenium removes lipid peroxides by glutathione peroxidase enzymatic reaction, disable the pathogenic role of the reactive oxygen species and free radicals, cooperate with vitamin E as two ways of animal body anti-oxidant. (2) Selenium can protect and maintain the integrity of the immune system and can enhance animal and human humoral and cellular immune function. (3) Promotes and maintain reproductive performance of animals, it is necessary for males to produce sperm. (4) Enhance T cell-mediated tumor-specific immunity, enhance anti-cancer effects, and regulate thyroid gland to maintain normal physiological function. (5) Selenium can antagonize the arsenic, mercury, cadmium and other heavy metal elements in the poisoning effect on the body. (6) promote growth, maintain cardiovascular health, and maintain normal function of the visual organs.

In animal diets, 0.1 mg/kg selenium in the content is benefit for animal, while 5 to 8 mg/kg selenium in the content is harmful, therefore the amount of animal diets supplemented is minimal (1/10,000,000 to 5/10,000,000). The scope between physical demand and poisoning amount of selenium is narrow (about 50 times). Therefore selenium in animal diets must be dispersed uniformly. Otherwise, the utility will be affected, resulting in selenium poisoning or poor efficiency.

China allows the use of sodium selenate and selenium yeast as selenium feed additive. Sodium selenate is cheap, and has high selenium content. But it is highly toxic, and the dose is difficult to control. It also has redox effects which is harmful on the animals and the environment. So, as our requirement selenium in animal diets must be added in the form of premix, normally selenium premix contains about 200 mg/kg selenium in content. There are two ways to produce selenium premix: First, mixed with other mineral (such as iron, copper, zinc, manganese) salts by mechanical mixing method to form mineral salts premix. Its advantage is no need of selenium dispersion separately. Use the other minerals as the dispersion carrier, and no longer need others (such as wheat flour, powder, etc.) carriers dispersed. However, sodium selenate has the physical and chemical properties of soluble in water, easily absorbing moisture and caking, illiquid, and the selenium content is only two ten thousandths, so it is difficult to mix and disperse uniformly. Second, use chaff powder as an adsorbent, spray aqueous solution of sodium selenate on chaff powder, mix evenly to form selenium thinner, then mix with other ingredients and dry to made selenium premix. This method has the same disadvantages as described above. It also has disadvantages such as more processes, high production costs, and not suitable for intensive production. Therefore, some countries restrict using sodium selenate as selenium nutritional supplements, and use organic selenium widely (such as Sweden, Japan, Finland). Sweden provides piglet feed must use organic selenium, Japan prohibit the use of sodium selenate in the feed in 1993, in United States only 0.3 mg/kg inorganic selenium can be added to feed.

Organic selenium, such as selenium yeast, has high animal absorption and utilization, and low toxicity, has not adversely effect on animals and environment. However, the price of organic selenium is high, and the selenium content is low. The selenium content of selenium yeast is only one-thousandth. By selenium content, the price of selenium yeast is several hundred of times higher than sodium selenite. The cost of organic selenium restricts its application in feed.

Copper is involved in the body hematopoiesis. It plays an important role in the heme synthesis and red blood cells maturation. It is an essential component of a variety of enzymes in animals, participates in the process of animal osteogenesis, hair and fur pigmentation and keratinization. Copper is also very important to animals reproduction. Copper is an indispensable micro-nutrient for animal feed to add. China Patent No. ZL95192983.6 disclosed a "micro-nutrient additives", which involves a similar orthorhombic atacamite-type crystalline basic copper chloride (TBCC) for animal feed additives. Chinese invention patent No. ZL200610060144.1 disclosed a "Botallackite preparation methods and the use," it uses a monoclinic botallackite crystalline basic copper chloride for animal feed addictives. Botallackite and atacamite are isomeric. They are powder with good liquidity and low solubility, have good mixing property, easy to be processed with feed, won't destroy vitamins and fats in feed, and have high bioavailability.

Selenium and copper are both trace mineral elements needed for animal feed, and have biological synergy in body anti-oxidation. But there is still no study reported in selenium-copper composite element feed additive, particularly in selenium-copper composite element feed additive combines the advantages of crystalline basic copper chloride such as good liquidity, suitable particle size, low solubility, no damp caking, and advantages of sodium selenite such as low cost.

SUMMARY OF THE PRESENT INVENTION

An object of the present invention is to provide a method of producing selenium covered basic copper chloride which has a nonhygroscopic property, good liquidity, and stable chemical property. In addition, the selenium covered basic copper chloride is easy to incorporate with feed, low price, low cost in adding, weak acidic solubility, easy to absorb.

Another object of the present invention is to provide a use of the selenium covered basic copper chloride produced by the method.

Accordingly, in order to accomplish the above objects, the present invention provides a method of producing selenium covered basic copper chloride, comprising steps of:

(a) mixing crystalline basic copper chloride (TBCC), water and stabilizer in a reactor to form a first mixture, wherein the weight ratio of crystalline basic copper chloride (TBCC), water and stabilizer is 1:1~10:0.001~0.01, and stirring and adding 0.05~0.15 by weight ratio of sodium hydroxide solution into the first mixture for 10 to 100 minutes of reaction time, wherein hydroxyl-modified crystalline basic copper chloride is obtained after discharging, rinsing, and negative pressure suction filtration; and (b) adding hydroxyl-modified crystalline basic copper chloride and water in the reactor to form a second mixture, wherein the weight ratio of hydroxyl-modified crystalline basic copper chloride and water is 1:1~10, and stirring and adding 0.01~0.1 by weight ratio of selenous acid into the second mixture for 10 to 100 minutes of reaction time, wherein selenium covered basic copper chloride comprising crystalline basic copper chloride, basic cuprous selenide, and basic cupric sulfate is obtained after discharging, rinsing, and negative pressure suction filtration.

Crystalline basic copper chloride is one of or a combination of crystals including atacamite of orthorhombic crystal system, paratacamite of trigonal crystal system, and botallackite monoclinic crystal system.

Crystalline basic copper chloride is a round granular particle with 30~200 micron.

The stabilizer contains organic multyhydroxy compound.

In particularly, the stabilizer is one of glycerol, glycol, and sorbitol. The concentration of sodium hydroxide solution is 5~25%.

The weight ratio of basic copper chloride, basic cuprous selenide, and basic cupric sulfate of selenium covered basic copper chloride is 100:0.1~10:0.1~10. In other words, the weight ratio of basic copper chloride, basic cuprous selenide, and basic cupric sulfate is 100:0.1~10:0.1~10.

The process of the preparation method is shown in FIG. 1, the reaction mechanism of each step is as follows:

1. Modification of Surface Hydroxyl Groups to TBCC

When crystalline basic copper chloride reacts with the sodium hydroxide solution, the stabilizer having multi-hydroxyl compounds will ensure copper oxide not being generated. The chloride on the surface is replaced by hydroxyl to form a hydroxyl-modified basic copper chloride. As tested, 50% of chloride in the crystalline basic copper chloride can be replaced by hydroxyl. Additionally, the shape, particle size, and liquidity of the hydroxyl-modified basic copper chloride is the same as the crystalline basic copper chloride except the color changing from green to blue-green slightly. The relative reaction equation is as follows:

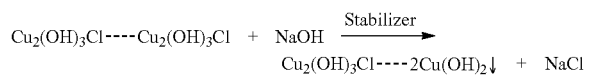

2. Basic Cuprous Selenide Covering Basic Copper Chloride

By adding basic cuprous selenide solution to hydroxyl-modified basic copper chloride, the selenous acid will have the hydrolytic reaction with the hydroxyl on the surface of alkaline copper chloride. Since the reaction is between a solid-phase and a liquid-phase, the reaction occurs on the surface of solid-phase basic copper chloride orientedly. The reaction is mild, and the speed is uniform. The generated basic cuprous selenide uniformly deposits on the surface of the basic copper chloride. The relative reaction equation is as follows:

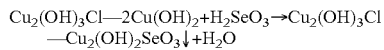

3. Basic Cupric Sulfate Covering Basic Cuprous Selenide

By adding copper sulfate solution to the basic cuprous selenide covered basic copper chloride, the hydrolytic reaction occurs, so the basic cuprous selenide covered basic copper chloride is covered by a layer of basic cupric sulfate. Therefore, the basic cuprous selenide is enclosed in the middle by the layer of basic cupric sulfate. This will protect the selenite radical and make its property more stable. The relative reaction equation is as follows:

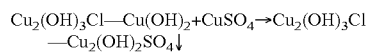

FIG. 2 shows the structure of the selenium covered basic copper chloride prepared by the above method. The basic copper chloride 1 is located in the center portion. The basic cuprous selenide 2 covers the basic copper chloride 1. The basic cupric sulfate 3 covers the basic cuprous selenide 2. In other words, the basic cupric sulfate 3 forms an outer shell portion, the basic copper chloride 1 forms a core portion, and the basic cuprous selenide 2 forms the intermediate portion between the outer shell portion and the core portion.

The present invention also provides a use of the selenium covered basic copper chloride prepared by the above method. The selenium covered basic copper chloride prepared by the above method can be used as feed addictive.

The ratio of selenium and copper in animal diets is generally 0.2~3:100. According to the present invention, the ratio of selenium and copper in the selenium covered basic copper chloride prepared by the above method can be controlled arbitrarily in the range of 0.1~10:100 based on usage. The copper content of the selenium covered basic copper chloride is 50~59%, and the selenium content is 0.5~5%. It is proved that selenium covered basic copper chloride is a dilution using basic copper chloride as a carrier and using basic cuprous selenide as selenium active ingredients. This is helpful for selenium to disperse in animal feed.

The present invention overcomes the disadvantages of sodium selenite which is toxic substance, easy to absorb moisture, difficult to control the doses, and chemically inactive, and has redox effect, and adverse impacts on animals and environment. The selenium covered basic copper chloride produced by the method provided by the present invention has good liquidity, and is insoluble in water and easy to add into the feed for animal. Because selenium exists in form of basic selenite which is not soluble in water, and is also covered by basic cupric sulfate, its toxicity is low, and its chemical property is stable. It doesn't react with other components in the animal feed, and has not redox effect. Since basic selenite is not soluble in water but soluble in weak acid, it provides the theoretical basis for the bioavailability of selenium covered basic copper chloride. Using the selenium covered basic copper chloride of the present invention as trace element for animal feed additives, it is palatable and has no adverse effect on environment. It can be widely used in animal feeds.

These and other objectives, features, and advantages of the present invention will become apparent from the following detailed description, the accompanying drawings, and the appended claims.

DETAILED DESCRIPTION OF THE PREFERRED EMBODIMENT

Figure 1:
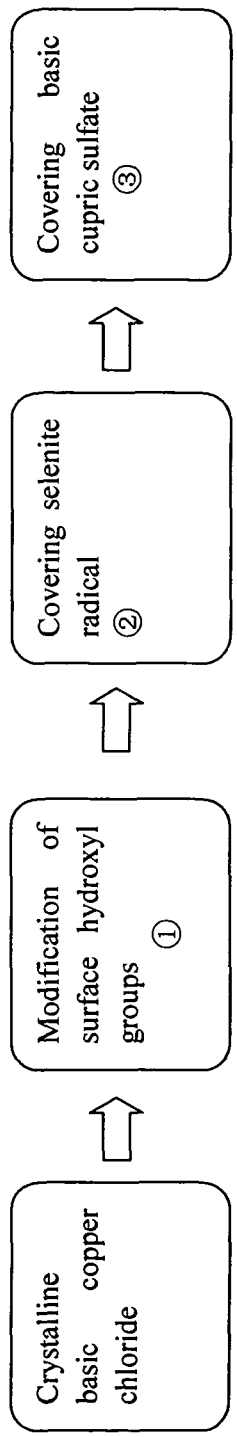
FIG. 1 is a flow chat of the process of preparation according to the present invention.
Figure 2:
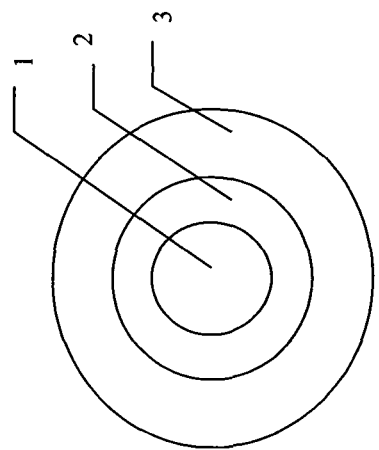
FIG. 2 is a schematic view of the structure of the selenium covered basic copper chloride produced by the method of the present invention.

1. Preparation of Selenium Covered Basic Copper Chloride

Add 1000 kg of botallackite, 1500 L of water, and 1 kg of glycerol to a 2M³ enamel reactor to form a first mixture. The reactor is then actuated to start stirring the first mixture. During stirring the first mixture, 350 kg of sodium hydroxide solution with 20% concentration is added into the first mixture to form a second mixture. The reaction temperature is maintained at 30 to 60° C. for one hour until the pH value of the second mixture is 9. Then, the second mixture is placed into a vacuum suction filter for suction filtration, is rinsed by tape water, and is then suction filtered again until the second mixture is dried, such that hydroxyl-modified crystalline basic copper chloride is obtained. Then, the hydroxyl-modified crystalline basic copper chloride is placed in the 2M$^3$ enamel reactor and 1500 L of water is added thereinto to form a third mixture. The reactor is actuated to stir the third mixture at the reaction temperature of 30 to 60° C. for one hour. During stirring the third mixture, 24 kg of selenous acid is added into the third mixture to form a fourth mixture for a reaction time of one hour until the pH value of the fourth mixture is 7. Then, 30 kg of Copper Sulfate Pentahydrate is added into the fourth mixture to form a fifth mixture for a reaction time of one hour until the pH value of the fifth mixture is 7. Accordingly, the fifth mixture is a solution without containing any copper ion. Then, the fifth mixture is discharged, rinsed, and negative pressure suction filtered to obtain 1010 kg of selenium covered basic copper chloride.

2. Selenium Covered Basic Copper Chloride Physical and Chemical Nature Testing and Elements Determination Selenium covered basic copper chloride is blue-green powder with 30~200 micron in size which is good at liquidity and insoluble in water.

Analysis of selenium covered basic copper chloride solubility in water and in weak acid solution simulating animal stomach acid environment:

Dissolve 10 g of citric acid, 10 g of ammonium citrate, and 2 ml of concentrated hydrochloric acid in 1 liter of distilled water, to prepare a weak acid solution of ammonium citrate buffer solution with pH value of 3.7.

Analysis steps: weight 0.1 g of selenium covered basic copper chloride and place in a flask with cover. Add 100 liter of weak acid solution of ammonium citrate buffer solution, oscillate 1 hour at 37±1° C. water bath, and filter by Whatman No. 42 filter paper. Then, determine the selenium and copper contents in the filtrate respectively by using ICAP-9000 Plasma Emission Spectrometer, and calculate the solubility.

Analysis of test results: in selenium covered basic copper chloride, the content of selenium is 1.43%, the content of Cu is 56.9%. Selenium covered basic copper chloride is difficult to dissolve in water, the solubility is less than 0.2%. But it is soluble in weak acid solution, wherein the solubility is 98% or more. So, selenium covered basic copper chloride is easy to be absorbed by animals. Under the rumen of ruminants as a water-based environment (water content is 85~90%), it can reduce the antagonism of selenium and copper with molybdenum and sulfur in rumen, and improve their absorption and utilization in ruminant digestive tract.

3. Application of Selenium Covered Basic Copper Chloride Premix

The comparison of traditional recipe and recipe using selenium covered basic copper chloride produced by the method mentioned above added for swine dedicated mineral salts premix (1 kg premix per ton of feed) is shown in Table 1:

TABLE 1

| Element | Fe | Cu | Se | Zn | Mn | I |
|---|---|---|---|---|---|---|
| Content g/kg | 120 | 10 | 0.25 | 90 | 40 | 0.45 |
| Formula 1 | FeSO$_4$•7H$_2$O | TBCC | Sodium selenite | ZnSO$_4$•H$_2$O | MnSO$_4$•H$_2$O | KI |
| Amount g/kg | 609 | 17.2 | 0.56 | 250 | 112 | 0.59 |
| Formula 2 | | | selenium covered TBCC | | | |
| Amount g/kg | | | 17.57 | | | |

The content of selenium in the feed of formula 1 and 2 are determined respectively according to GB/T13883-92 "Determination of selenium in the feed" using the swine feed produced by the same process. The coefficients of variation of selenium contents of swine feed using premix formula 1 and 2 with six sampling are 20% and 5.8% respectively. Compared with feed using sodium selenite, the feed using selenium covered basic copper chloride largely increases the dispersion of the selenium in the feed.

4. Comparison of the Effects of Selenium Covered Basic Copper Chloride and Sodium Selenite on Piglet Growth-Promoting, Antioxidant Capacity and Utilization of Selenium Use 60 30-day-old three-way cross weaned piglet with average weight of 7.5 kg (male and female each in half) for testing, to analyze the effects of selenium covered basic copper chloride on growth-promoting, selenium organization deposition, and anti-oxidation capacity compared with sodium selenite and basic copper chloride. According to the weight, sex, litter, the 60 weaned piglets were randomly divided into five groups. Group 1 is the control group using corn-soybean meal-dray whey powder diet with adding 150 mg/kg of basic copper chloride but without adding selenium. Group 2 and 3 are testing group using corn-soybean meal-dray whey powder diet with adding 0.3 mg/kg and 0.5 mg/kg of sodium selenite respectively, and adding 150 mg/kg of basic copper chloride. Group 4 and 5 are testing group using corn-soybean meal-dray whey powder diet with adding 0.3 mg/kg and 0.5 mg/kg of selenium covered basic copper chloride respectively. The testing period is 35 days, including 7 days of pre-test period and 28 days of formal test period. The results show that: (1) compared between the two concentrations 0.3 mg/kg and 0.5 mg/kg of selenium sources within testing groups, there is not significant difference on piglet growth performance, but compared with the control group, the daily gain and feed conversion ratio are significantly increased, it is clear the selenium covered basic copper chloride is safe and can promote the growth efficiently. (2) the piglets fed with two sources of selenium, their whole blood GSH-Px activity and SOD activity are significantly higher than the control group. For the groups added with selenium covered basic copper chloride, their MDA content in serum is significantly lower than control group and is lower than groups added with sodium selenite. This means selenium covered basic copper chloride has a better oxidation resistance of body than sodium selenite. (3) four groups added with selenium, the selenium levels of their liver and kidney are significantly higher than the control group. In the group added with 0.3 mg/kg of selenium covered basic copper chloride, the selenium content in liver is 9% higher than the groups added with 0.3 mg/kg of sodium selenite. The copper contents in live are almost the same among groups. This means the selenium utilization rate of selenium covered basic copper chloride is higher than sodium selenite, and copper utilization remains the same.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method for preparation of selenium covered basic copper chloride, comprising steps of:
   (a) mixing crystalline basic copper chloride (TBCC), water and stabilizer in a reactor to form a first mixture;
   (b) adding and stirring sodium hydroxide solution into said first mixture for 10 to 100 minutes of reaction time, wherein hydroxyl-modified crystalline basic copper chloride is obtained after discharging, rinsing, and negative pressure suction filtration;
   (c) adding said hydroxyl-modified crystalline basic copper chloride and water in said reactor to form a second mixture;
   (d) adding and stirring selenous acid into said second mixture for 10 to 100 minutes of reaction time to form a third mixture; and
   (e) adding copper sulfate pentahydrate in said third mixture for reaction, wherein selenium covered basic copper chloride comprising crystalline basic copper chloride, basic cuprous selenide, and basic cupric sulfate is obtained after discharging, rinsing, and negative pressure suction filtration.

2. The method, as recited in claim 1, wherein said crystalline basic copper chloride is one or more crystals selected from the group consisting atacamite of orthorhombic crystal system, paratacamite of trigonal crystal system, and botallackite monoclinic crystal system.

3. The method, as recited in claim 2, wherein said crystalline basic copper chloride is in form of round granular particles with 30-200 micron in size.

4. The method, as recited in claim 1, wherein said stabilizer is an organic multihydroxy compound.

5. The method, as recited in claim 4, wherein said stabilizer comprises one of glycerol, glycol, and sorbitol.

6. The method, as recited in claim 1, wherein concentration of said sodium hydroxide solution is 5-25%.

7. The method, as recited in claim 1, wherein weight ratio of basic copper chloride, basic cuprous selenide, and basic cupric sulfate of said selenium covered basic copper chloride is 100:0.1-10:0.1-10.

8. The method, as recited in claim 1, wherein weight ratio of said crystalline basic copper chloride (TBCC), water and stabilizer is 1:1-10:0.001-0.01, wherein 0.05-0.15 by weight ratio of said sodium hydroxide solution is added and stirred into said first mixture, wherein weight ratio of said hydroxyl-modified crystalline basic copper chloride and water is 1:1-10, wherein 0.01-0.1 by weight ratio of said selenous acid is added and stirred into said second mixture.

* * * * *